United States Patent

[11] 3,609,362

| [72] | Inventor | Barton H. Laney<br>Deerfield, Ill. |
|---|---|---|
| [21] | Appl. No. | 703,938 |
| [22] | Filed | Feb. 8, 1968 |
| [45] | Patented | Sept. 28, 1971 |
| [73] | Assignee | Nuclear-Chicago Corporation<br>Des Plaines, Ill. |

[54] ERROR CORRECTION IN RADIOACTIVE SAMPLE MEASUREMENTS
17 Claims, 7 Drawing Figs.

| [52] | U.S. Cl. | 250/71.5, 250/83.3 R, 250/106 SC |
|---|---|---|
| [51] | Int. Cl. | G01t 1/20 |
| [50] | Field of Search | 250/71.5, 83.3, 106 SC |

[56] References Cited
UNITED STATES PATENTS

| 3,246,150 | 4/1966 | Stoddart et al. | 250/71.5 |
|---|---|---|---|
| 3,320,419 | 5/1967 | Thomas et al. | 250/71.5 |

Primary Examiner—Archie R. Borchelt
Attorney—Leonard G. Nierman

ABSTRACT: A liquid scintillation counting system with provision for measuring the efficiency correction of each primary sample measurement without intervening change of transducer gain is also provided with frequent standardization of transducer gain to eliminate efficiency change due to gain change from both the primary measurement and the efficiency correction measurement. Gain measurement and correction are made by circuits comparing the cumulative differential count on opposite sides of a standard alpha-particle spectrum peak with limit values numerically increased in successively longer portions of the counting interval. Gain correction is made in accordance with statistically probable gain error, and the counting interval is reinitiated. Particular circuits are described.

Inventor:
Barton H. Laney
By: Leonard J. Nieman
Attorney

FIG.4

ERROR CORRECTION IN RADIOACTIVE SAMPLE MEASUREMENTS

This invention relates to automatic liquid scintillation counting equipment and certain features thereof may also be adapted to use in measurement and comparison of radioactivity disintegration rates and similar quantities in other applications.

A well-known problem in liquid scintillation counting is the variation, from sample to sample, of the efficiency of conversion of the disintegration events occurring in the sample, normally beta rays, to light pulses incident on the photomultipliers. The diverse phenomena which produce such effects in the liquid scintillator are collectively known as "quench. In the counting of liquid scintillation samples of a particular isotope, there is selected a range of amplitudes of the pulses produced by the detector, normally the peak of the characteristic spectrum of the isotope, and the pulses of the selected range of amplitudes are counted. Quench effects in the sample, however, shift the peak of the spectrum with respect to this counting "window," in addition to reducing the overall number of pulses which are substantially above the noise level.

A number of forms of quench correction are in common use for high-accuracy measurements in commercial liquid scintillation counting equipment, the quench correction indication normally being automatically produced and recorded as an auxiliary item of data supplementing the principal count on each sample. In the so-called "channels ratio" measurement, two windows are employed (either in the same region of the spectrum as the principal measurement count or elsewhere), whose counting rates are oppositely affected by a gain shift, and the ratio of the counts in the windows is employed as the quench correction, based on empirical calibration curves correlating efficiency of measurement with this ratio. In the so-called "external standard" measurement, the sample is exposed to an auxiliary external standard gamma-ray source in a separate counting operation and the count produced by the gamma source in a counting window (or the ratio of counts in two counting windows) is, by empirical calibration, made the efficiency correction index.

A shift in the spectrum with respect to the counting window may also occur as a result of a change in photomultiplier high voltage, amplifier gain, etc. However, present-day equipment is sufficiently stable in this respect so that any change in gain producing a spectrum shift comparable to that of appreciable quenching can occur only over a period which is very long compared to the immediate sequence of a measurement count and the corresponding external standardization count, so that changes in efficiency due to gain shift in the transducer system are automatically reflected in the efficiency measurement. Accordingly, the slow drifts in gain which are residually present in practical equipment are often neglected where efficiency measurements are made on each sample in any event, until measurements on unquenched sources are substantially affected, whereupon the equipment is adjusted and recalibrated.

Neglect of slow gain changes can actually produce substantial error in the efficiency measurement. Were the light output pulses of a quenched sample a uniformly attenuated equivalent of those of an unquenched sample, and were the spectrum produced by an external gamma source identical with that under measurement, the efficiency measurement, irrespective of how made, would be unaffected in its accuracy by slow gain changes. However, neither of these is the case. The alteration of the spectrum produced by quenching is materially different from that produced by mere attenuation, both with the activity under measurement and with external gamma rays. Under these circumstances, the quench correction measurement, particularly if made by external standardization, can be accurately interpreted in terms of a correction factor for the primary measurement only if changes of efficiency due to transducer system gain are excluded from the measurement. The effects of small gain changes on accuracy are particularly marked where the external standardization method is used for quench correction.

In the present invention, the transducer system gain is automatically measured and standardized at frequent intervals (long before measurements on unquenched samples are substantially affected), thus eliminating the source of error in efficiency correction while at the same time eliminating the necessity for the manual readjustments formerly made upon the observation of a drift of a grossness prevented entirely by the invention.

Various forms of automatic gain-adjustment systems have heretofore been employed for continuous stabilization of scintillation counting systems against relatively rapid gain drift during a measurement. In one known form of such device, continuous comparison is made between the counting rates of two pulse trains, at least one of which is generated by a standard source; where both channels are generated by the source and have equal rates in the standard gain condition, the null of the average differential rate in the standard gain condition makes exactness of the source intensity relatively unimportant. Such a system can, at least in theory, be used in practicing the present invention in its broader aspects by periodically activating and inactivating the stabilization system. But the results obtained with those of such known systems which are sufficiently simple to be practical for the present use are in general inadequate in performance when so adapted. The reason for this inadequacy lies primarily in the inability of such prior systems to discriminate in the most efficient fashion between errors in gain and statistical variations in the disintegration rate of the radioactivity source generally employed (and employed in the present invention) in detecting gain changes.

Precision measurement of average rate of occurrence is well known to require the accumulation of a large number of counts, in order to insure against statistical error. If the gain is altered in immediate response to each deviation from a zero net count, the "stabilization" achieved can well be a detriment, rather than a benefit. In recognition of this, many prior art systems have employed ratemeter or filter-smoothed error indications with long time constants to avoid oscillation of the gain with expected statistical variations in the occurrence of pulses from the standard source. In others, particularly those employing a motor for gain correction, the gain adjustment may be actuated only each time the counting differential exceeds some particular value, or the gain adjustment may be made too slow to respond to statistical excursions. It is found upon study that prior systems, for example as described in U.S. Pat. No. 3,101,409 and 3,279,205, would inherently require a compromise between the taking of a very long time for restoring of the gain to a preset value, on the one hand, and the sacrifice of high accuracy of the preset value established, on the other hand, when it is attempted to adapt such systems to intermittent, rather continuous, close-tolerance gain standardization with adequately simple construction.

In the gain-standardization system of the invention, the two counting rates discussed above are compared in a novel form of comparator which detects major inequality between average rates in two compared channels within a relatively short time after initiation of operation, but nevertheless permits sufficiently long counting at the final gain value for assurance that a failure to signal inequality is a satisfactorily reliable indication of gain accuracy. The pulse signals are compared by continuously registering the aggregate differential count at all times during a counting interval long enough for verifying the accuracy of the ultimate setting with any desired degree of precision. If and when the absolute value of this difference exceeds a maximum or limit, inequality form average rate is signalled, the gain is readjusted in the direction indicated to be required, the differential is reset to zero, and a new counting cycle is initiated. In the present comparator, the maximum or limit is increased with lapse of time from the commencement of the count, but at a rate less than proportional to the lapse of time. The permitted limit of difference thus represents a diminishing percentage of the total counts or pulses occurring since the commencement. In a desirable form of construction, the tapering of the permitted percentage differential is carried out in steps defining discrete successively longer subintervals of the overall counting interval and is selected to produce a small but finite probability of spuriously (i.e., with the gain exactly correct) exceeding the limit in each subinterval. However, the taper of accepted percentage difference may be otherwise selected and may be made continuous rather than stepwise.

As a further aspect of the invention, the amount of each gain adjustment is dependent upon the elapsed time when the existence of an error in gain is signalled. The present system utilizes the observation that when the limit of the absolute value of the differential count is exceeded at an early stage of the measurement, the probable error in gain is relatively high, and when the limit is exceeded only at a late stage, the probable error in gain is relatively low, even through the limits are fixed to produce generally equal low probability of spuriously signalling error at each stage of the counting interval when the gain is actually correct. In the present system, the amount of gain change introduced in the readjustment is accordingly made relatively large when the unbalance limit is reached in an early phase of the counting, and relatively small when the unbalance limit is reached in a terminal stage of the counting. Correction based on the probable gain error derived from the time of detection maximizes the probability of immediately establishing balance in the counting channels, and minimizes the probability of overshoot or undershoot sufficient to produce an error signal in the opposite direction or again in the same direction at the same (or earlier) phase of a new counting cycle. Thus an early correction will, with considerable reliability, produce a gain condition which is sufficiently closer to the standard or correct value to permit counting to a more advanced stage (and finer adjustment of gain) upon resetting and commencement of a new counting interval, if indeed such early correction does not actually set the gain within the small range required (with high confidence) to produce a differential count remaining within the prescribed limits to the end of the entire interval.

With the overall construction just described, accurate gain standardization is accomplished in a relatively short time with high reliability. If the gain existing at the time of initiation of the standardization operation is already exactly correct, the entire counting cycle normally (but not always) produces no error-indicating signal, and the stabilizer may be immediately inactivated (or the cycle reinitiated, in constructions for semicontinuous use, or in constructions where the statistical assurance of a second full count is desired). If an error is signalled before the end of the count, the gain is adjusted by the amount most probably indicated by the time of detection to be required, the differential count is reset to zero, and the counting cycle is reinitiated. If error is again signalled, this normally (but of course not always) occurs at a later stage than previously, a smaller gain change is made, and the cycle again reinitiated. This continues until the entire interval is completed without an error-indication, whereupon the gain standardization is complete. If the error prior to standardization is gross (as may be the case where equipment has been used for a long period for measurements of low accuracy requirement, and with the gain standardization thus not used) it is promptly detected and brought into the approximate range by a series of maximum adjustments rapidly performed, the extra time required by the appearance of gross error being very small. Of course, there is at all times a small but finite probability that error will be falsely signalled, and when this occurs an unneeded adjustment is made and then corrected. But the frequency of such occurrence is readily made sufficiently low to add little to the average readjustment time.

Although the invention is preferably utilized for the present purpose by combining all of the novel features generally described above, it will be observed that certain of its more general aspects may be otherwise employed. For example, the novel form of error or null comparator may be adapted to comparison of rates of any radioactivity or similar random distribution events (or comparison of one such rate with a standard periodic signal) where similar considerations of detection time and accuracy are involved. As an example of the converse, the gain of any photomultiplier may be manually standardized to a highly accurate predetermined value by employing a differential count in windows at an alpha-particle scintillation peak, with gain adjustment and reinitiation each time the net count is seen to exceed a predetermined value, the latter being increased as the count progresses, but at a rate less than proportional to the time lapse, and the amount of the gain adjustment being decreased with the lapse of time since initiation at which the adjustment is made.

The features and advantages of the invention, both as described in general above, and in further aspects, will be more completely understood from the embodiment shown in the drawing, in which.

Figure 1:
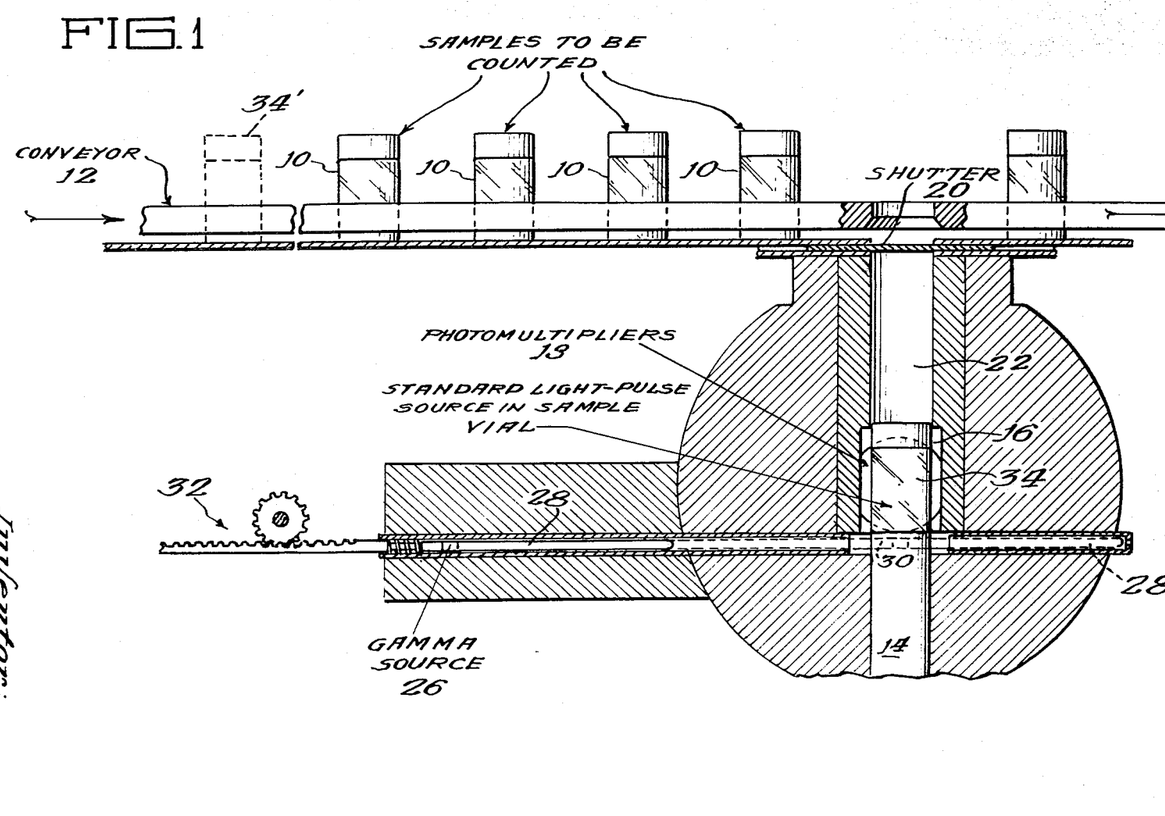
FIG. 1 is a more or less schematic view in section showing a portion of the mechanism of a typical automatic liquid scintillation counting apparatus in which the invention is employed.

Referring first to FIG. 1, there is shown a portion of the mechanism of scintillation counting apparatus having a quench correction provision of the construction disclosed and claimed in the copending application of Raymond L. Meeder and Joseph E. Kus, Ser. No. 541,767, filed Apr. 11, 1966, of the same assignee. Details of construction, and the control system by which the various portions of the apparatus are driven and cycled in counting of samples are not illustrated, being unnecessary to understanding of the present invention and sufficiently illustrated and described in the above application and U.S. Pat. No. 3,163,756 of the same inventorship as that application.

In the apparatus illustrated, vials or bottles 10 each containing liquid scintillator and the beta-emitting substance to be counted (for example dissolved tracer-bearing tissue of a human or animal organ) are moved by conveyor 12 which slides each successive sample onto the elevator ram 14 when the latter is in the raised position (not shown). The sample is then lowered into the counting chamber 16. Photomultipliers 18 on opposite sides of the chamber serve as transducers for the scintillations occurring in the sample vials. A shutter 20 excludes the entry of light through a vertical passage or aperture 22 through which the elevator ram 14 moves. Resilient rings 24 on the periphery of the top of the elevator form a light seal in the aperture 22 when the elevator is in the partially raised position, preventing the entry of light into the chamber during the time when the shutter 20 is open in the changing of samples.

External quench standardization is provided by a gamma-ray ray source 26 attached to the inner end of a shield rod 28. The elevator 14 has a horizontal passage 30 just beneath the upper surface passing the shield rod 28 to a quench-standardizing position wherein it is seated in the main shielding, the source 26 being then located centrally beneath the sample vial. The gamma source and shield rod are driven between the withdrawn position, illustrated in solid-line form, and the quench-standardizing position, illustrated in dotted form, by a rack and pinion drive at 32. The sample's quench or efficiency is measured by taking a separate count with the external standardization source, this count being used for correction of the principal measurement, taken with the standardization source withdrawn. Further details of construction of the external standardization provision are set forth in the above-mentioned copending application, this external standardization construction being merely one exemplary means of obtaining an indication of, and correction for, variations in sample efficiency.

Separate provision is made for standardization of the gain of the transducer system, in accordance with the present invention. In the simple embodiment of FIG. 1, vial 34 (shown positioned within the counting chamber), which constitutes a standard light pulse source and preferably contains an alpha-emitter of suitable character in a scintillator, occupies a preselected position in the conveyor 12. Gain change or drift, primarily occurring in the photomultipliers 18, is corrected from time to time by interrupting the sample counting and inserting the standard source 34 into the chamber to expose the source to the photomultipliers, establishing a standard output pulse amplitude spectrum employed for gain standardization as hereinafter described. The standard light-source vial 34 is then returned to the conveyor 12 and the counting and efficiency measurement of the samples is continued. The period or interval between gain standardizations is selected in accordance with the inherent stability of the system and the overall accuracy of measurement which is desired. If gain standardization is desired more frequently than once each cycle of the conveyor, the device may be programmed in any well-known manner to interrupt the normal progression of the conveyor and position the standard vial 34 for counting, or one or more additional generally identical standards, such as shown in dotted form at 34′, may be interposed in the normal sample sequence, with provision for activating the gain-standardizing circuits (to be described below) when these positions of the conveyor are reached.

Figures 2, 6, 7:
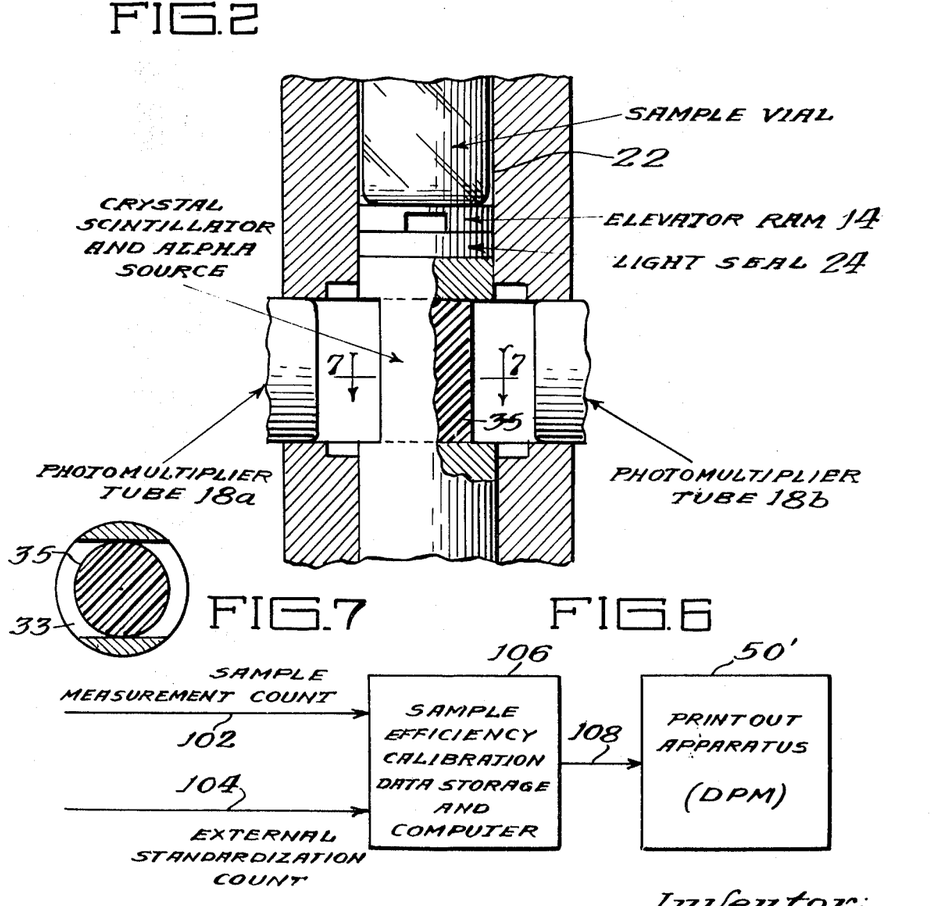
FIG. 2 is a fragmentary view of a scintillation counting apparatus similar to that of FIG. 1, but incorporating a different construction of a standard light source which is an element thereof.
FIG. 6 is a schematic block diagram showing a modification of the system of FIG. 4 producing a direct indication of the absolute disintegration rate in successive liquid scintillation samples.
FIG. 7 is a sectional view taken along the line 7—7 of FIG. 2.

The specific construction of the standard light pulse source and the mechanism for exposing it to the photomultipliers are not in themselves part of the present invention, the simple system of FIG. 1 being illustrative. However, there is shown in FIG. 2 a more advantageous construction for this purpose. In FIG. 2, the parts corresponding to those shown in FIG. 1 are indicated by like reference characters. A crystal scintillator 35 bearing an alpha source disposed to produce a sharp spectrum peak is permanently positioned in a passage 33 through the elevator ram 14 substantially spaced from the top. The standard source is exposed to the photomultipliers 18a and 18b for gain standardization, in an intermediate portion of the ram operating cycle in which the sample vial next to be counted (or just counted) is positioned above the chamber 16 but beneath the shutter, and light emission from the sample vial is prevented from reaching the photomultipliers by the light seal 24 on the periphery of the upper portion of the elevator. With this construction, the gain standardization may be made as often as desired, such as every nth sample, or even before each sample, it merely being necessary to stop the ram, activate the gain standardization, and then recommence normal operation when the standardization is complete.

Figure 4:
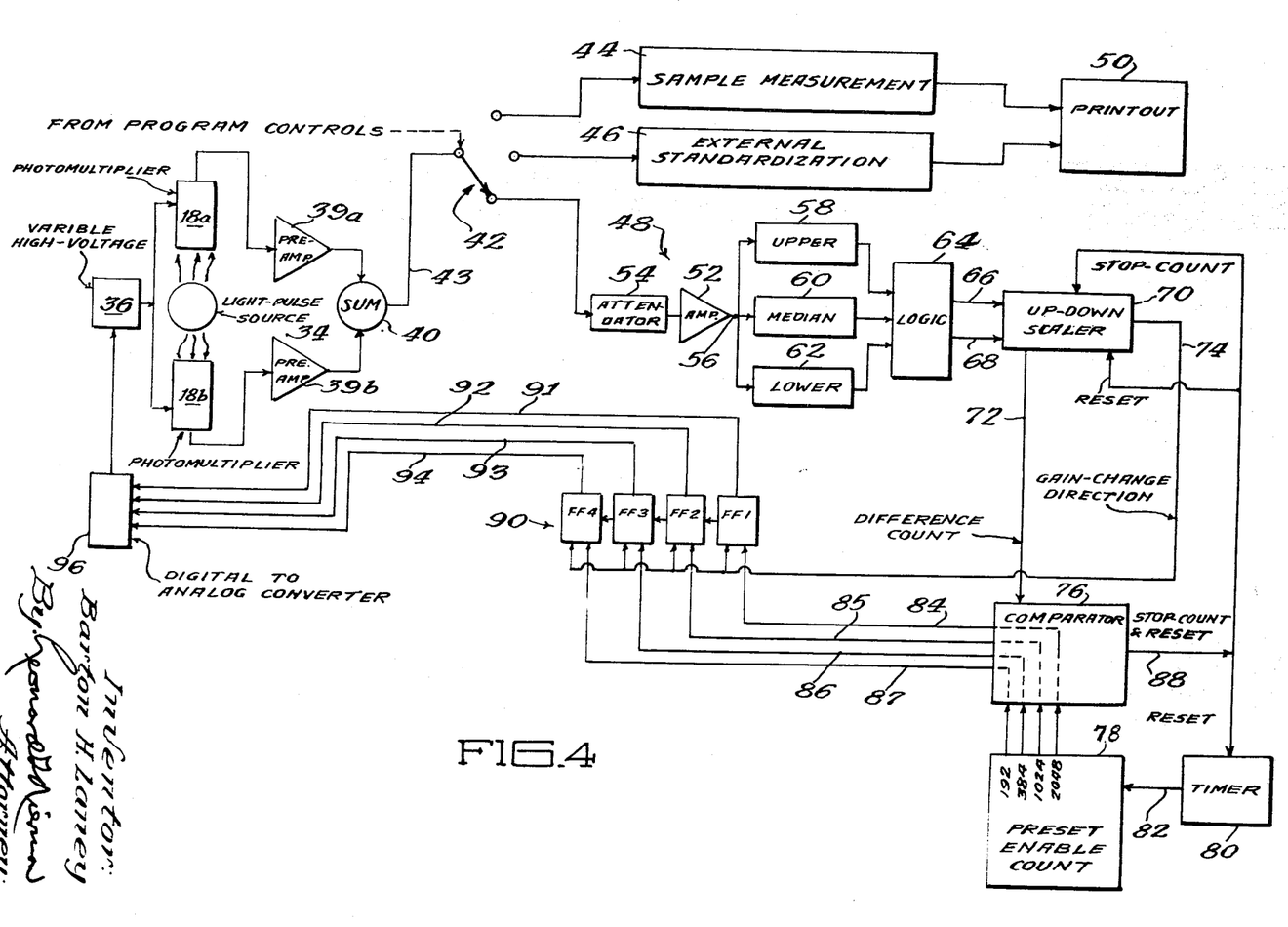
FIG. 4 is a schematic block diagram of the electronic system of the counting apparatus incorporating the invention.

The electronic portion of the system is shown schematically in FIG. 4. As is conventional, the photomultiplier tubes 18a and 18b are connected to a common high-voltage supply 36 and their outputs are fed through preamplifiers 39a and 39b and summed at 40. (As will be apparent to those skilled in the art, the coincidence system commonly used in such equipment for discrimination against multiplier noise is omitted from the drawing.) For conceptual simplicity, the drawing illustrates a switch 42 which selectively connects the pulse summation output 43 either to sample measurement circuits 44 or to external standardization circuits 46 or to a gain standardization system 48. As likewise schematically shown, there is provided the usual printout apparatus 50 for recording the counts of sample measurements and external standardization measurements. Actually, of course, many or most of the components of the sample measurement circuits 44 and the external standardization circuits 46 are the same in commercial constructions, and the switching of signal input at 42 schematically represents the alterations of the discriminator setting, etc., which are performed to produce the various "modes" established by the program controls in conventional liquid scintillation equipment.

It will also be understood, in similar fashion, that certain portions of the gain standardization system 48 to be described, which perform the same general type of pulse height analysis function as is required in the measurements of samples and in the external standardization measurements, are again not actually constructed from separate components, but utilize pulse height analysis circuits already present, the equipment being placed in the gain standardization "mode" by mere switching of circuit values, etc. The sample measurement mode is of course established for the primary measurements on unknown samples; the external standardization mode is established when the external gamma-ray source is employed to irradiate the unknown sample for quench or sample efficiency measurement; and the gain standardization mode is established when the photomultipliers are exposed to the standard alpha scintillation pulses.

The input portion of the gain standardization system 48 is generally similar to the corresponding portion of a system heretofore known for gain standardization in other types of scintillation counting. It comprises an amplifier 52 with a suitable input attenuator 54 and with its output 56 coupled to an upper discriminator 58, a median discriminator 60, and a lower discriminator 62, the outputs of which are coupled to coincidence logic circuits 64 having an output 66 transmitting a pulse in response to each input pulse of an amplitude falling within the upper "window" (passing the median discriminator but not the upper) and an output 68 transmitting a pulse in response to each input pulse falling within the lower window (passing the lower discriminator but not the median). These two window outputs are fed to separate inputs of an up-down or add-subtract scaler 70, which at all times registers the absolute value of the difference in the total number of pulses in the windows, as well as producing a signal indicative of the sign of this differential. Such a scaler or register consists of a forward or positive scaler with a subtraction input in addition to the forward or addition input, with provision for reversing the input connection whenever the differential count would otherwise be less than zero. The count registered on the scaler 70 at any time is of course represented by the states of all its stages, but in the simplified schematic diagram, the output or readout representative of the instantaneous count is shown as a single readout line 72. The signal indicative of sign or direction of the difference in window counts appears as an output at 74.

Before describing the details of the construction and operation of the balance of the circuits of FIG. 4, it will be advantageous to first mention that they represent in the aggregate a simplified construction merely approximating an optimum mode, in accordance with the invention, for readjusting the high-voltage supply at 36 to produce the standard gain conditions of the photomultiplier system in a time which is short for any given accuracy of setting. Understanding of these circuits will be facilitated by first pointing out the statistical basis of their function.

In the standard gain condition, the two windows 66 and 68 are set to have identical average counting rates. With theoretically perfect setting of the gain to the standard condition, the differential count fluctuates about zero in a statistical manner, the probability of existence of any given net count at any given instant following a normal probability curve peaked at zero, with the standard deviation being calculable as the square root of the total count passed by both windows since commencement of the differential count. For any selected limit of deviation from zero, there is a finite probability of reaching such a deviation value with any given counting time even when the gain is exactly correct. Use of the differential count as an indicator of gain drift to be employed for a correction involves selection of a high enough permissible instantaneous differential count to maintain the probability of false indication of gain error at a low level. This restriction represents the practical limit of accuracy of this general method of detecting and correcting gain drift in any given time.

Where the gain is not at its exactly standard value, the fluctuations about zero just mentioned are superimposed on a net count accumulation in one direction or the other which increases with passage of time, again in a statistical manner about an average net rate. Accordingly, departure of the gain from a standard condition may be detected by detecting the appearance of an excess absolute value of the differential count, i.e., a departure from zero which is sufficient to give adequate assurance it is not due to mere temporary excursion of an average zero count. By selection of a suitably long counting period, the gain drift may be detected with any desired low probability of error by detecting the accumulation, within that time, of a predetermined absolute value of the differential of the counts in the two channels or windows.

In principle, it is accordingly possible merely to adjust the gain by a fixed small amount in response to such an exceeding of a single predetermined level, with the direction of adjustment determined by the direction of the differential count, and repeat such long-interval counts until a gain condition is reached where the limit is not exceeded in the entire long interval. Such a simple system is found to require an undesirably long average time of interruption of sample-counting in each gain standardization, without the further improvements provided.

In the present invention, the detection and correction of gain drift are made in a manner which is capable of the same high accuracy but with a much smaller average length of interruption of the normal counting operations. In essence, the system employs the theory of probability to produce accurate and acceptably reliable standardization in a minimum of time. The simplest form of the theory or concept which is embodied in modified form in the device of FIG. 4 is illustrated highly schematically in FIG. 3 by curves which are not quantitative, but merely sketched to demonstrate general manners of variation.

Figure 3:
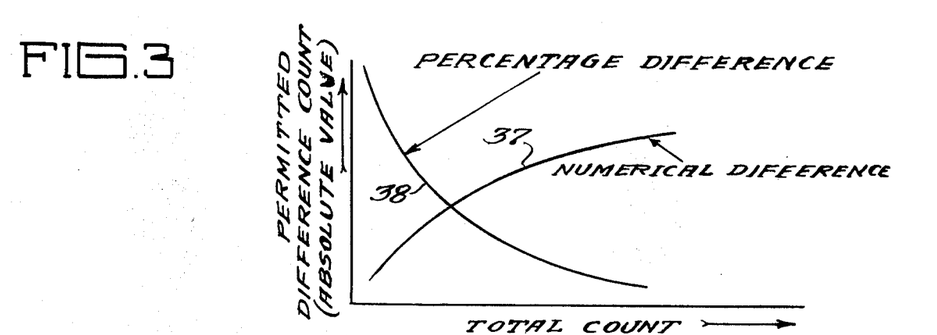
FIG. 3 is a schematic illustration of a principle of operation of the invention.

As shown at 37 in FIG. 3, in the principle of the present invention, the absolute value of the deviation from zero permitted in the differential count (before considering gain error requiring correction as having been detected) is not constant but is increased as the count progresses, at a rate less than proportional to the total integrated count (or elapsed time), so that the permitted difference as a percentage of the total integrated count (38) diminishes as the interval proceeds. If the differential registered on the scaler at any time exceeds the permitted difference then effective the gain is adjusted in the appropriate direction, and the entire counting operation is then started over, with the difference scaler or register reset back to zero. The limit may be exceeded at either an early or late stage of the counting. The permitted percentage difference is made relatively high in the early stages of the count to avoid an y excessively high probability of spurious error indication. However, it is not desirable that the percentage difference limit in early phases of the counting be too high to make early detection of relatively large gain errors unduly unlikely, since this would result in substantial addition to the overall time required for reaching the correct gain by successive adjustments.

The optimum limit of the permitted count at any time is thus governed by the application of probability theory with the objective of reaching the best balance between sensitivity to gain error and spurious signalling of gain error to produce, on the average, the shortest possible overall correction time. For exact equality of the probability of a false error indication at every instant of time, the permitted limit, expressed in net counts, would be exactly the same multiple of the standard deviation; since the latter is proportional to the square root of the total count passed by the windows, the limit increases in rough proportion to the square root of the elapsed time. But complete constancy of the limiting absolute value of the differential count, expressed as a multiple of the standard deviation from an average zero value, is not generally optimum, as will be seen from the fact that spurious error signal at a very early stage adds relatively little to the overall time of measurement. Further, the probability of an erroneous error signal at any given time, i.e., with any given total count, is not exactly calculable from only the instantaneous standard deviation, since such a calculation does not reflect the effect of the failure of the differential count to exceed the limits which existed at earlier times.

A typical limit for the last portion of the counting interval in accordance with the invention might be $2.3\sigma$, where $\sigma$ is the standard deviation from zero average count. With this limit, an exactly correct gain value has a 2.14 percent probability of producing a spurious error signal in this portion of the count, the probability of acceptance being 97.86 percent. The probability of acceptance of a gain which is inaccurate is of course smaller, by an amount depending upon the magnitude of the gain error. The probability of passing as acceptable a gain of any given nonstandard value is diminished as counting time is lengthened. The full counting interval is accordingly selected to produce any desired degree of statistical assurance that failure to signal gain error indicates that the gain is within particular specified limits of the deviation from its standard value.

Exact calculation of fully optimum limits at all times during the entire interval is not made in any simple fashion, and varies widely with design factors such as the range of initial gain error normally expected. It will be observed that if the limits were at all times $2.3\sigma$, the probability of obtaining a spurious error signal at some time in the entire interval even though the gain were exactly correct would be much higher than the 2.14 percent probability existing merely considering the end of the count. On the other hand, the adverse effect of false error signal on overall time consumption diminishes with earliness of the time at which such false signal is given. The theory of optimum design is complex and has not been fully developed, but it will be apparent that a continuous taper of the limit as a percentage of total count as time passes should be such as to produce a probability of acceptance of a correct signal which is at all times relatively high, but not too high to be useful for detection of actual gain errors at a reasonably early time where possible. In general, limits representing $3.0\sigma$ or so for the exactly standard gain condition have very little effect on the cumulative probability of false error signal, but nevertheless produce detection of gain errors at a substantially earlier time than can be done with a uniform preset count limit.

The device as thus far described may, if desired, be used by altering the gain by a fixed amount each time the limit is reached, and thereupon resetting the differential count to zero and commencing a new count, continuing this until the gain has come to the point where the limit is not reached in the entire counting interval. In such a construction, the gain increment (or decrement) thus uniformly made is necessarily smaller than the gain errors which have a high probability of producing error signals at the end of the counting interval. In the event of existence of a major gain error, such a construction requires s substantial number of gain adjustments, normally after longer counting in each instance, before an accepted gain condition is reached. The invention utilizes the probability characteristics of such a system as already described to further shorten the average overall correction time. Mention has already been made of the fact that the shaping of the limit curve as a function of time should permit early detection of gain error to the extent compatible with low probability of spurious detection of error if no error actually exists. The most probable gain error signalled by exceeding of the limits at any given time after commencement of the count is approximately the gain error producing an average differential counting rate aggregating the limit count in the time elapsed. The time of occurrence of the signal is thus interpretable in terms of the probable magnitude of the gain error. By properly correlating the amount of each gain correction with the time elapsed before the limit signal which produces the correction, there is achieved a substantial probability of immediately setting the gain to an acceptable value and in any event of reducing the number of adjustments required before the gain is set to an acceptable value.

The principles discussed above in connection with continuous variation of the differential count limit may be applied in variant fashions, some distinctly advantageous. In place of continuous monitoring of the differential count, comparisons with the limits may be made only intermittently during the measurement. Such a mode of operation involves apparent sacrifice of the average speed of detection of gain errors. However, it can greatly reduce the cumulative probability of spurious error signal as compared with a system in which the limit sensing is performed continuously with similar limits; thus the comparison limits used in time-sampling comparisons at properly chosen times can be somewhat narrower for the same degree of assurance against spurious error signals when the gain is correct, increasing the sensitivity to gain error at each point of time when the comparison is made. Since differential counts due to gain error are basically cumulative rather than oscillating, the time-sampling comparisons reduce the cumulative probability of spurious gain error signals without greatly delaying the detection of true gain error signals. If time sampling is employed, the times of sampling should be sufficiently spaced to reduce appreciably the probability of detecting large-deviation maxima of an average zero count. With time spacings sufficient so that the fact of acceptance of the instantaneous value of the count as within the limits at one comparison time does not greatly affect the probability that the count will exceed the greater limits existing at the next comparison time, i.e., when the standard deviation at the time of one sampling is small compared to the number of counts to be added and subtracted before the next sampling, the complexity of calculation earlier referred to in the case of continuous monitoring and limit variation may be largely eliminated; performance characteristics can be approximated with reasonable accuracy by calculation of the probability of exceeding the limits at each comparison time under various conditions of gain in the same manner as it would be calculated were the earlier comparisons not made, i.e., solely from the normal probability curve, taken with calculation of the standard deviation for each condition involved. Cumulative probabilities may then, when desired, be calculated by mere multiplication, rather than complex integration.

A further variant of the invention, partaking to some extent of certain advantages of continuous comparison and to some extent of certain advantages of time-sampled comparison, and having peculiar advantages of its own in simplicity of construction with known circuits, employs continuous comparison with the differential count limits, but increases these in stepwise fashion. Desirably, each preset limit on the absolute value of the count is sufficiently higher than its predecessor so that there is a negligible possibility of a spurious error signal in a zero average-rate condition until shortly before the limit is again changed (or the end of the entire interval, in the case of the last limit). As regards spurious error signals with exactly correct gain, the action is similar to that of time-sampled comparison at the end of each subinterval. But gain errors too small for detection in the previous subinterval (or not detected because of an improbable statistical excursion) may nevertheless be detected long before the preset limit is again stepped (or the interval ended), each successive subinterval being a greater multiple of the aggregate of earlier subintervals than the ratio of its count limit to the next earlier count limit, so that gain error counts, accumulated generally linearly in time, may actuate the limit signal long before the arrival of the end of the subinterval (this timesaving being of particular importance in the terminal portion of the overall interval).

Returning now to FIG. 4, it will be seen that a variety of particular circuits and devices may be devised for comparing the instantaneous count at 72 with limits varied as described and adjusting the gain in accordance with the principles discussed above. One or two obvious examples may be briefly mentioned for illustration. The difference count at 72 may, for example, be converted to an analog voltage compared with the voltage instantaneously generated by a motor-driven function potentiometer generating a limit voltage, and the same motor may, by its position at the time of an error signal, fix a voltage thereupon added to the multiplier power supply prior to resetting and reinitiation of the count. As another example, the digital difference count may be compared with another digital difference count fed by a clock system suitably gated to produce the desired limit changes, and the multiplier gain change may be determined by a digital count decreased by gating of the same clock pulses. The particular system of FIG. 4 represents an approximation to the operation of such relatively complex devices which accomplishes the same general purpose in a highly simplified manner.

The difference count 72 is continuously compared at 76 with a preset count level fixed by enabling circuits 78. A timer 80 serves, as indicated at 82, to control the enabling circuits to select one of four successively higher preset counts for comparison at 76 as the counting interval progresses. The numerical values 192, 384, 1,024, and 2,048 here employed as preset count values are "round" in binary notation, selected for convenience of count comparison. The comparator 76, upon detecting identity of the difference count 72 with a preset count at 78, produces a stop count and reset signal on an output line 88 and also a pulse on one of four output lines 84, 85, 86 or 87 corresponding to the particular preset count which has thus been matched (as indicated schematically by dotted lines through the comparator 76 showing the correspondence). These output lines are respectively coupled to the separate inputs of the four stages of a cascaded binary register 90, the successive flip-flop stages of which are designated FF1 through FF4, each of which is reversed in state by either a pulse from its input 84, 85, 86 or 87 or (except in the case of FF1, the input stage) by a "carry" from the preceding stage returning from the "1" to "0" state. The output 74 from the up-down scaler 70, bearing the information regarding the direction of the difference count, is coupled to subtraction-mode inputs to the four binary register stages. By internal circuitry well known for such purposes, a pulse on any of the inputs 84 through 87 accordingly either adds to or subtracts from the four-bit number on the register a number corresponding to the stage at which the pulse is introduced.

The stages of the register 90 are read out by corresponding output lines 91 through 94 and produce an analog voltage in a digital-to-analog converter 96 which is a part of the high-voltage supply 36. In one construction, the gain addition produced by the "1" state of each stage of the register 90 is proportional to the order of the stage by which it is controlled. With this construction, the gain change effected by reversal of the state of FF4 is eight times that produced in FF1, and the overall voltage supplied by the controlled portion of the high-voltage supply produces a gain variation proportional to the number registered in binary fashion on the register 90.

Figure 5:
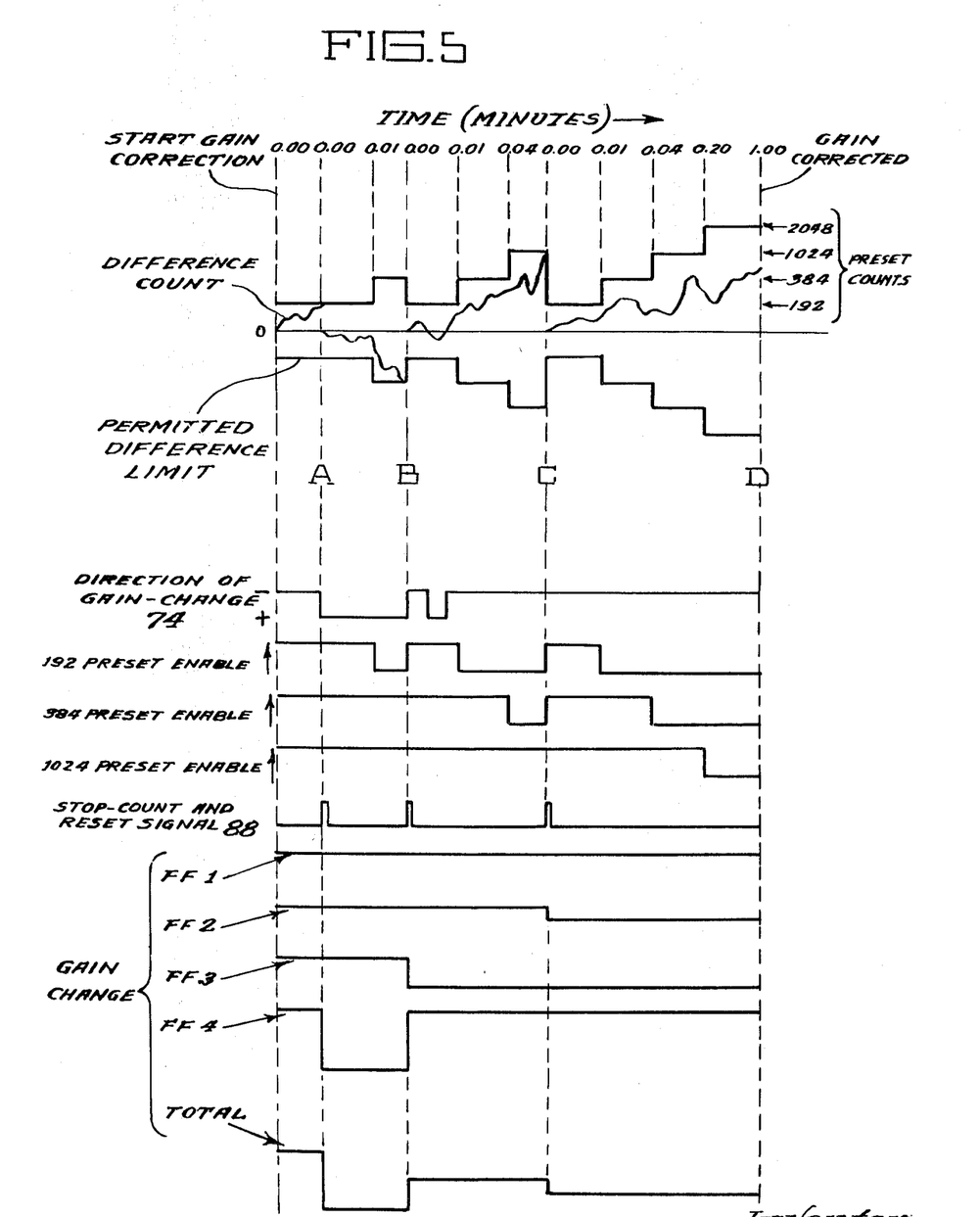
FIG. 5 is a time diagram of the operation of the system of FIG. 4.

The overall operation will be readily understood from the timing diagram of FIG. 5. (It should be noted that the time scale representation in this Figure is not linear and, further, that the time values shown in minutes at the top are not integral or total lapses of time from the start of operation shown at the left, the time scale recommencing with each resetting upon exceeding the limit count.)

At the commencement of operation, the difference count at 72 of FIG. 4 is of course 0. All of the preset count values at 78 of FIG. 4 are in the "enabled" condition. The timer 80 disables the preset count 192, 0.01 minute after commencement, the preset count 384 after 0.04 minute, and the preset count 1,024 after 0.20 minute. No disablement is required for the highest selectable preset limit, 2,048, which is the effective preset count in the last part of the counting time, extending to 1.00 minute.

At the time of commencement of standardization, the flip-flop stages FF1 through FF4 are in whatever state they remain from the last previous standardization. The direction of gain change signal 74 is reversed by the first pulse occurring, if it was previously left in the opposite condition.

In FIG. 5, there is shown the manner in which these conditions are altered in an exemplary gain standardization. The top portion of the Figure shows the variation of the new count and the limits with time. (Note that neither the horizontal time scale nor the vertical count scale represent "coordinates" in other than a schematic sense.) The lower portion shows the corresponding operations of the indicated portions of the circuit. In the simple example selected, immediately upon the start of the gain correction or standardization, the difference count (with the normal statistical fluctuations) commences to build in the direction of excess counts in the channel shown as being positive with respect to 0, representative of too high a gain. With the difference count positive, the direction of gain change signal calls for subtraction of gain if and when the difference count should exceed its permitted limit, which is 192 counts in this first portion of the counting cycle. Flip-flops FF1 through FF4 are here shown as the 1111 state, i.e., the state representing the lower end of the range of internal gain drift of the transducer system due to temperature, etc., which existed at the time of the last previous standardization.

At the point of time designated A, before lapse of 0.01 minute, the difference count reaches 192, the stop-count-and-reset signal 88 is sent to the up-down scaler and the timer, and a pulse is sent to FF4, reducing the multiplier gain by a substantial amount. With the gain thus adjusted, counting is restarted at the end of the stop-count-and-reset signal 88, which is desirably of the order of a second in duration to assure equilibrium of the new gain (this time lapse being omitted from the drawing for simplicity). The differential count now begins to grow in the direction showing excess count in the lower window and the gain change direction signal 74 is accordingly immediately reversed. After 0.01 minute, the predetermined count 192 is disabled, and the permitted limit increases to an absolute value of 384. This limit is reached by the count at B in FIG. 5. In addition to the stop-count-and-reset signal 88, a pulse is now sent to FF3, which returns it to the 0 state, but this reverses the state of FF4, so that the gain now receives a net increase of half the amount it was diminished at A. Counting again commences, with the 192 limit restored. The direction of gain change signal 74 undergoes alternations according with statistical variations of the difference count about the 0 axis, but becomes stable in the condition calling for negative change of gain as the cumulative difference count showing excess in the upper channel gradually rises with the usual statistical fluctuations superimposed. The 192 preset is again disabled at the end of the 0.01-minute initial subinterval, and now the 384 preset is likewise disabled after being effective for a 0.03-minute subinterval bringing the total elapsed time to 0.04 minute, so that the permitted absolute difference value becomes 1,024. This is exceeded at C. The disablement of the lower preset count values is again removed along with the resetting of the count and the timer, and an input pulse is applied to FF2. Because the direction signal 74 calls for subtraction, FF2 goes from the 1 to 0 state without carry to the following stage and the gain is now reduced by half of the last previous increase, or a quarter of the original decrease. The recommencement of the entire count at C is generally the same as previously described. The reduction in voltage has not been sufficient to completely remove the accumulation of net excess count in the higher channel, but the growth of the difference count is now too slow to reach the preset limits which prevail in any of the four subintervals of the overall counting interval, at the end of which the gain correction is complete, and the equipment reinitiates the counting and efficiency measurement of ordinary samples, again to be interrupted for gain standardization at such time as required for the accuracy of the measurements made.

It will be observed that the total time for all of the successive counts and resettings is, in the illustrated example, only fractionally more than the time occupied for the full 1 minute count by which the gain as finally established was determined to be within the limits required. Obviously, when the limit is exceeded one or more times near the end of the entire counting period, the total time requirement will be greater; detection of gain error in this last part of the counting cycle (not illustrated) is of course followed by the even smaller corrective variation provided by a signal to FF1.

The median discriminator 60 is centered at or near the maximum of the peak of the alpha pulse spectrum in the standard condition of gain. The upper and lower discriminators are preferably at levels far removed from the peak, including between them an aggregate of approximately 80 percent of the total pulses (40 percent in each window) in the detector output, excluding only the pulses of extremely high and low amplitude. The effect of this is to make the accuracy of the system essentially independent of possible drifts in upper and lower discriminator levels, the stability of the gain standardization system being determined essentially entirely by the stability of the discriminator level of the median discriminator at the spectrum peak. For this purpose, it is desirable to span more than half, and preferably more than three-quarters, of the alpha source spectrum.

With a source producing 400,000 counts per minute in each window, the standard deviation $\sigma$ of the differential count under conditions of zero average differential count (perfectly adjusted gain) is 894 counts at the end of the one minute full interval. The final limit value of 2,048 represents $2.3\sigma$, giving a 97.86 percent probability that a perfectly adjusted gain will not exceed the limit at the end of this last subinterval, the probability that the limit will not be exceeded at any time during the subinterval being only very slightly lower. The preset count limits 192, 384, and 1,024 used in the earlier subintervals represent probabilities of acceptance under standard gain conditions which are of the same general order ($2.15\sigma$ at the end of 0.01 minute, $2.14\sigma$ at the end of 0.04 minute, and $2.56\sigma$ at the end of 0.20 minute, corresponding to probabilities of acceptance of 96.83 percent, 96.79 percent and 98.92 percent). The resulting cumulative probability of acceptance in the case of exactly correct gain is approximately 90 percent. The bulk of any spurious error signals will occur after a relatively short counting time, and the gain adjustment thus erroneously made will normally be reversed with equal speed. (The occasional making, and subsequent reversing, of erroneous gain corrections is not illustrated in FIG. 5.)

From a known standard alpha source spectrum shape and overall counting rate, the probable gain error represented by the exceeding of any given limit at the end of any given subinterval, i.e., the error producing a mean differential counting rate reaching the limit at that time, may be determined by calculation, and the gain adjustment made equal thereto, as a rough approximation of the optimum adjustment, in this simple type of utilization of the invention. This adjustment is somewhat less than the probable gain error represented by exceeding the limit at an unknown time in the interval. Alternatively to calculation, the approximate gain adjustment may be experimentally determined by data from repeated counting runs under conditions of known gains, and the gain correction circuit then designed accordingly. In one construction, with the parameters of interval length, etc., as above, the exceeding of the limit in the last subinterval produces a gain change of approximately 0.025 percent; a gain which produces no error signal is accepted with approximately 98 percent confidence that the maximum error in gain is 0.05 percent.

Where optimum, as opposed to merely satisfactory, performance is desired, the optimum gain adjustment value for each subinterval is best found experimentally, by measurement of the average time required for producing a gain value "passed" by the correction system with various adjustment values in the vicinity of the approximate one selected as just mentioned, under actual operating conditions of the overall equipment, since exact optimum of the complex statistical factors involved is incapable of calculation, varying somewhat even with the statistical distribution of the magnitude of gain errors existing at the commencement of each standardization, the same being more or less true of the other design parameters which are chosen by statistical considerations, such as the exact limits (or times) employed in the earlier subintervals.

The exact time required for performing a standardization operation with a given degree of initial gain error of course itself varies on a statistical basis. The overall time for correcting a major gain error is, with any given choice of parameters, somewhat longer than the time for correcting a minor gain error, on the average, but the difference is relatively slight. It will be noted that for measurements requiring standardization of slightly less rigid tolerances than the high precision here produced, the last subinterval and its associated limit may be eliminated (as by provision of a control switch), the time of standardization thus being greatly reduced. In this event the maximum error in gain (with the same high confidence) is slightly over 0.1 percent.

A construction such as that illustrated and just described will be seen, from a statistical standpoint, to provide a continuous comparison of the differential count with a multiple of the standard deviation of a zero average count, the multiple being gradually reduced in each subinterval to a minimum value between 2.0 and 3.0, reached at the end of the subinterval, and thereupon abruptly increased and again gradually reduced as the next subinterval progresses. For circuit simplicity, step increases of the limits by a factor of at least 1.5 are desirable. In contrast with use of a constant preset numerical limit throughout the entire interval, the similar minimum multiples of the standard deviation reached at the end of each subinterval produce generally equal probabilities of false error signals in all portions of the overall interval, such portions here being successively longer discrete subintervals.

Adaptability of many aspects of the invention to purposes other than liquid scintillation counting, and for control of variables other than detector gain, and indeed for measurements for purposes other than control, may be seen. The comparison system here employed for speed in detection of the inequality of two portions of the alpha spectrum for control purposes, in which it is particularly advantageous, may be used to compare two radioactivity sources or a radioactivity source (or similar source of randomly occurring events) with a standard such as periodic pulses. Where such use is not followed by adjustment and repetition of the measurement, avoidance of false signals is paramount, and limits substantially smaller than $3.0\sigma$ should not be used at any point. On the other hand, limits of as low as $1.5\sigma$ may be used in early stage sampling-type comparisons and can with certain designs result in overall average timesaving where such a comparator is used for successive equal adjustments of a variable to produce an accepted equality.

It will also be seen that the function served by the timer in the illustrated embodiment in establishing the overall interval and the points of stepping of the limits can be performed by a counter which fixes the overall interval, and the subintervals, directly in terms of the aggregate number of counts in both windows. Where there is present no average rate of occurrence which is known with sufficient accuracy to permit reliance upon a timer, the interval and subintervals should be thus fixed directly in terms of the aggregate count, for example by a separate scaler counting both channels, with the preset limits of the differential count altered upon reaching preset aggregate counts recorded on the scaler. Such a construction is desirable, for example, in comparison of an unknown radioactivity source with a source employed as a standard of comparison, but of unknown intensity. The use of a standard source of long half-life in the present application permits the use of the timer which is in any event virtually universally present in commercial liquid scintillation equipment.

FIG. 6 shows a modification of the sample measurement portion of FIG. 4 to produce direct printout of sample measurements in terms of disintegrations per minute (DPM). As shown at 102 and 104, the sample measurement count and the external standardization count, rather than being printed out, are fed as inputs to computer circuits having the external standard sample efficiency calibration data stored therein. With the gain standardization of the invention, an external standardization measurement can be converted to a direct correction multiplication factor which may be reliably employed in calculating the actual disintegrations per minute occurring in the sample with acceptable accuracy, and the external standardization calibration may be permanently stored without the necessity of recalibration.

As may be seen, the teachings of the invention will readily be utilized in overall structures and procedures radically different in detail and in exact purpose from the specific devices illustrated and discussed above. Accordingly, the scope of the patent protection to be given the invention should not be determined from the particular embodiments herein described, but should extend to all uses of the invention as defined in the appended claims, and equivalents thereof.

What is claimed is:

1. In an automatic liquid scintillation counting system having:
   a. a chamber containing a photomultiplier transducer adapted to produce electrical pulses of an amplitude spectrum corresponding to scintillation intensities, such correspondence shifting with slow drifts in gain of the transducer,
   b. means to insert and remove samples to be measured, the samples comprising bodies of liquid scintillator of varying quench with radioactive material therein,
   c. means to count transducer output pulses of at least one selected amplitude range corresponding to a portion of the energy spectrum to measure the activity in each sample, and
   d. means to produce an efficiency correction count of at least one selected amplitude range of transducer output produced with the sample in the chamber and indicative of efficiency of the measurement count, each correction count and the corresponding measurement count being produced in sufficient time contiguity to assure the same transducer gain, the improved construction comprising:
   e. a standard source of light scintillations,
   f. means for interrupting the measurement and correction of samples and inserting only the standard source into the chamber at intervals substantially shorter than the time required for gain drift substantially affecting the efficiency of counting of unquenched samples,
   g. means for detecting shifts of the spectrum of transducer output pulses produced in response to the standard source from a standard spectrum, of a magnitude too small to substantially affect the efficiency of counting of unquenched samples, and
   h. means responsive to the detection of such shift to alter the transducer gain to restore the standard spectrum, and thereupon to resume the measurement and efficiency correction of samples,
   so that efficiency changes due to gain changes are substantially entirely eliminated from the correction indication on quenched samples.

2. The system of claim 1 characterized by the means for detecting shifts of the spectrum comprising:
   j. means for initiating and registering a differential count from the time of initiation of two portions of the spectrum of the standard source which are of equal average rate in the standard spectrum,
   k. means for comparing the registered value at least once in each of a plurality of successively longer stages of counting with limiting values increasing in absolute value with lapse of time in approximate proportion to the standard deviation of an average zero differential count,
   l. means for altering the transducer gain upon detecting of the reaching of such a limiting value, in the direction to restore the standard spectrum, and for thereupon reinitiating a new differential count and comparison as aforesaid, and m. means for resuming the counting of samples upon failure to detect the reaching of such a limiting value within a predetermined interval of counting.

3. The system of claim 2 characterized by:

n. the amount of each gain alteration decreasing with advancement of the stage of counting at which the detection is made.

4. A comparator for comparing average rates of occurrence in two pulse train signals at least one of which is of statistically random interval distribution, comprising:

a. means for initiating a predetermined counting interval and continuously registering the differential count from the time of initiation thereof, b. means for comparing the registered value, at least at a plurality of intervals as the count proceeds, with limiting values increasing in absolute value, but at a rate substantially less than proportional to the lapse of time, c. means for producing a first output indication signalling inequality of average rates upon reaching by the registered value of a limiting value with which comparison is then made, and d. means for producing a second output indication signalling substantial equality of average rates upon completion of the counting interval without production of the first output indication.

5. The comparator of claim 4 wherein the limiting values increase in approximate proportion to the square root of the time from initiation of the differential count.

6. The comparator of claim 5 having means to indicate the sign of the differential.

7. The comparator of claim 6 wherein the first output indication means indicates the portion of the counting interval wherein the limit was reached, whereby the probable magnitude of inequality is indicated.

8. Apparatus for standardizing a control variable of radioactivity measuring systems and the like comprising, in combination with the comparator of claim 7:

e. means for producing and feeding to the comparator pulse trains having equal average rates of occurrence in a standard condition of the variable to be controlled, at least one being of random time distribution, and at least one being of average rate responsive to the variable to be controlled, f. and means responsive to each operation of said first output indication means to adjust the variable in the direction to eliminate the differential, by an amount responsive to the portion of the interval wherein the limit is reached, and to reset the registering means and thereupon commence a new counting interval, until the second output indication is produced.

9. The control system of claim 8 wherein the amount of the adjustment approximately corresponds to the probable error of the variable indicated by the portion wherein the limit is reached.

10. The control system of claim 8 wherein the means to adjust the variable comprises a plural stage binary pulse register having each binary stage coupled to the variable to produce, in corresponding states, increments of the variable each of a magnitude approximately twice that of the preceding stage, means responsive to the first output indication to transmit a pulse to one of the binary register stages selected in response to the indication of the portion of the counting interval wherein the limit was so reached, being a highest order stage when the output indication is received in the first portion of the interval and a lowest order stage when the output indication is received in the last portion of the interval, and means responsive to the direction in which the differential count exceeds the limit to selectively condition the binary register for addition or subtraction of the pulse so transmitted.

11. The control system of claim 10 wherein the limits established in successive portions of the interval, together with the lengths thereof, produce probable magnitudes of inequality of average rates corresponding to probable errors of the variable varying by successive factors of one-half.

12. Apparatus including the comparator of claim 4 for standardizing the response of a radioactivity transducer system comprising:

a. a source of radioactive disintegration events to which the transducer is responsive, b. means including said comparator for detecting deviation of the response of the transducer system from a standard response, and c. means responsive to each output indication signalling inequality to alter the transducer response in the direction to restore the standard output and to reset the registering means and reinitiate the counting interval.

13. The apparatus of claim 12 wherein the limiting values with which comparison is made are, at least once in each of a plurality of subintervals of successively greater length, of a numerical value between $2.0\sigma$ and $3.0\sigma$, where $\sigma$ is the standard deviation of an average zero differential count at the time of comparison.

14. The apparatus of claim 13 wherein comparison is made with limits substantially less than $3.0\sigma$ only during a small fraction of each such subinterval, so that early sensitivity to true inequality is obtained without great increase in the cumulative probability of spurious signalling of inequality.

15. The apparatus of claim 14 wherein the comparison is made continuously and the numerical limits are changed stepwise to make the limits less than $3.0\sigma$ only for a short time prior to each change.

16. The apparatus of claim 15 wherein each stepwise change in limits is by a factor greater than 1.5.

17. The control system of claim 9 wherein the adjustment corresponds to the error of the variable producing a mean differential counting rate reaching the limit at the end of said portion of the interval.

PO-1050
(5/69)

UNITED STATES PATENT OFFICE
CERTIFICATE OF CORRECTION

Patent No. 3,609,362          Dated September 28, 1971

Inventor(s)  Barton H. Laney

It is certified that error appears in the above-identified patent and that said Letters Patent are hereby corrected as shown below:

Column 2, line 47, second patent number should be 3,270,205.

Column 2, line 67, after "inequality", "form" should be —of—.

Column 4, line 67, delete the second occurrence of "ray".

Column 8, line 34, after "existing" insert —from—.

Signed and sealed this 25th day of April 1972.

(SEAL)
Attest:

EDWARD M. FLETCHER, JR.
Attesting Officer

ROBERT GOTTSCHALK
Commissioner of Patents